(12) United States Patent
Matsumoto (10) Patent No.: US 9,328,254 B2
(45) Date of Patent: May 3, 2016

(54) SILVER INK COMPOSITION AND SUBSTRATE

(75) Inventor: Takafumi Matsumoto, Tokyo (JP)

(73) Assignee: TOPPAN FORMS CO., LTD., Tokyo (JP)

( * ) Notice: Subject to any disclaimer, the term of this patent is extended or adjusted under 35 U.S.C. 154(b) by 367 days.

(21) Appl. No.: 13/811,840

(22) PCT Filed: Jul. 27, 2011

(86) PCT No.: PCT/JP2011/067082
§ 371 (c)(1),
(2), (4) Date: Jan. 23, 2013

(87) PCT Pub. No.: WO2012/014933
PCT Pub. Date: Feb. 2, 2012

(65) Prior Publication Data
US 2013/0121872 A1    May 16, 2013

(30) Foreign Application Priority Data

Jul. 30, 2010 (JP) .................................. 2010-172662
Jun. 22, 2011 (JP) .................................. 2011-138437

(51) Int. Cl.
C09D 11/52   (2014.01)
C09D 11/037  (2014.01)
C09D 11/322  (2014.01)

(52) U.S. Cl.
CPC ............... C09D 11/52 (2013.01); C09D 11/037 (2013.01); C09D 11/322 (2013.01)

(58) Field of Classification Search
CPC ..... C09D 11/037; C09D 11/322; C09D 11/52
USPC .................................. 106/31.92; 252/519.21
See application file for complete search history.

(56) References Cited

U.S. PATENT DOCUMENTS

| | | | |
|---|---|---|---|
| 6,358,611 B1 * | 3/2002 | Nagasawa et al. ............ 428/403 |
| 6,577,056 B1 * | 6/2003 | Chang ........................... 313/493 |
| 7,683,195 B2 * | 3/2010 | Suganuma et al. ............. 556/40 |
| 8,226,755 B2 * | 7/2012 | Chung et al. .................. 106/1.19 |
| 8,445,578 B2 * | 5/2013 | Chung et al. .................. 524/423 |
| 2002/0148387 A1 | 10/2002 | An |
| 2007/0234851 A1 * | 10/2007 | Goia et al. ........................ 75/371 |
| 2009/0223410 A1 * | 9/2009 | Jun et al. ..................... 106/31.92 |
| 2010/0167051 A1 * | 7/2010 | Goia et al. .................... 428/402 |
| 2014/0026782 A1 * | 1/2014 | Chung et al. .................. 106/1.05 |
| 2015/0008376 A1 * | 1/2015 | Hirose et al. ............. 252/519.21 |

FOREIGN PATENT DOCUMENTS

| | | |
|---|---|---|
| JP | 10-183207 | 7/1998 |
| JP | 2000-331618 | 11/2000 |
| JP | 2003-191646 | 7/2003 |
| JP | 2004-315374 | 11/2004 |
| JP | 2009091621 A | 4/2009 |
| JP | 2009-114232 | 5/2009 |
| JP | 2009-197133 | 9/2009 |
| JP | 2009-535661 | 10/2009 |
| WO | 2007-004437 | 1/2007 |
| WO | WO2007112926 A2 | 11/2007 |

OTHER PUBLICATIONS

European Search Report for corresponding European Application No. 11812522.8, pp. 1-5 (Sep. 11, 2014).
Japanese Office Action for con-esponding Japanese Appl. No. 2011-138437, pp. 1-6, Oct. 6, 2015.

* cited by examiner

Primary Examiner — Helene Klemanski
(74) Attorney, Agent, or Firm — Hoffmann & Baron, LLP (57) ABSTRACT

There is provided with a silver ink composition which is formed by blending one or more kinds of silver β-ketocarboxylates selected from the group consisting of silver isobutyrylacetate, silver benzoylacetate, silver propionylacetate, silver acetoacetate, silver α-methylacetoacetate, and silver α-ethylacetoacetate, and an aliphatic primary or secondary amine having 1 to 10 carbon atoms, and a substrate with a surface on which a metallic silver layer which is formed by heating the silver ink composition is provided. According to the invention, it is possible to obtain a silver ink composition suitable for forming a metallic silver layer which has superior glossiness and specularity, and a substrate with a surface on which a metallic silver layer is formed using the silver ink composition.

11 Claims, 4 Drawing Sheets

SILVER INK COMPOSITION AND SUBSTRATE

TECHNICAL FIELD

The present invention relates to a silver ink composition suitable for forming a metallic silver layer which has superior glossiness and specularity, and a substrate with a surface on which a metallic silver layer is formed using the silver ink composition.

Priority is claimed on Japanese Patent Application No. 2010-172662, filed Jul. 30, 2010, and Japanese Patent Application No. 2011-138437, filed Jun. 22, 2011, the contents of which are incorporated herein by reference.

BACKGROUND ART

Glossy inks have various uses such as decoration and specular surfaces, and metal-containing ink compositions using silver particles or an aluminum paste as a filler are known. When the ink compositions are applied to substrates and an operation such as heating is performed thereon, substrates with a surface having a metallic layer formed thereon are obtained.

However, the metallic layers formed from the ink compositions have poorer glossiness and lower specularity than actual metals. It is thought that one reason for this is that the contact between metal atoms is insufficient in the formed metallic layers. As described above, even when using an ink composition containing a desired metal, it is unusual to form a metallic layer having desired glossiness and specularity and it is strongly desirable to develop an ink composition which can form a desired high-quality metallic layer.

Among various metals, metallic silver is widely used as a material of recording mediums and printing plates, and as a high-conductive material due to its superior conductive property. Examples of general conventional methods of manufacturing metallic silver include a method of heating silver oxide, which is an inorganic material, in the presence of a reductant. Specifically, for example, a paste may be prepared by dispersing granular silver oxide in a binder and adding a reductant thereto, and the paste may be applied to a substrate or the like and heated. In this manner, since heating is performed in the presence of the reductant, the silver oxide is reduced, the resulting metallic silver formed by the reduction is mutually fused, and a film including the metallic silver is formed.

However, when silver oxide is used as a material for forming metallic silver, a reductant is needed and there is a problem in that a treatment temperature thereof is extremely high, e.g., about 300° C. Furthermore, when metallic silver is used as a conductive material, in order to reduce the resistance of a formed film, it is necessary to use smaller silver oxide particles.

Regarding this, in recent years, a method of forming metallic silver using organic acid silver salt in place of an inorganic material such as silver oxide has also been reported. As the organic acid silver salt, for example, silver behenate has been reported (Patent Document 1). In addition, silver stearate and silver α-ketocarboxylate have been reported as new materials for forming metallic silver (Patent Documents 2 and 3).

However, even when using silver behenate, heating in the presence of a reductant is needed in order to form metallic silver. In addition, even when using silver stearate or silver α-ketocarboxylate, although the temperature is lower than in the case of the inorganic material, heating at about 210° C. or higher is needed in order to rapidly decompose the silver stearate or silver α-ketocarboxylate.

Therefore, a method of using silver β-ketocarboxylate, as a material for rapidly forming metallic silver even at low temperature without the need for a reductant, in place of silver oxide or organic acid silver salt has been disclosed (see Patent Documents 4 and 5). This method discloses that silver β-ketocarboxylate is used in combination with a compound having a lone pair such as an amine compound, a thiol compound or a phosphorus compound to improve stability of a silver ink composition in which the silver β-ketocarboxylate and the compound are blended, and metallic silver having a superior conductive property can be formed at a lower temperature than in the conventional cases.

CITATION LIST

Patent Document

[Patent Document 1] Japanese Unexamined Patent Application, First Publication No. 2003-191646
[Patent Document 2] Japanese Unexamined Patent Application, First Publication No. H10-183207
[Patent Document 3] Japanese Unexamined Patent Application, First Publication No. 2004-315374
[Patent Document 4] Japanese Unexamined Patent Application, First Publication No. 2009-114232
[Patent Document 5] Japanese Unexamined Patent Application, First Publication No. 2009-197133

SUMMARY OF INVENTION

Technical Problem

However, the methods disclosed in Patent Documents 4 and 5 disclose that a desired effect is not obtained in accordance with the combination of the silver β-ketocarboxylate and the compound having a lone pair, and it is important to select the blending components. In addition, these Patent Documents disclose that metallic silver can be rapidly formed at low temperature, but the appearance of the metallic silver such as glossiness and specularity is not evaluated at all and a combination of the blending components suitable for uses such as decoration and specular surfaces is not disclosed.

The invention is contrived in view of the above-described circumstances and an object of the invention is to provide a silver ink composition suitable for forming a metallic silver layer which has superior glossiness and specularity, and a substrate with a surface on which a metallic silver layer is formed using the silver ink composition.

Solution to Problem

In order to solve the above-described problems, according to the invention, a silver ink composition is provided which is formed by blending one or more kinds of silver β-ketocarboxylates selected from the group consisting of silver isobutyrylacetate, silver benzoylacetate, silver propionylacetate, silver acetoacetate, silver α-methylacetoacetate, and silver α-ethylacetoacetate, and an aliphatic primary or secondary amine having 1 to 10 carbon atoms.

In the silver ink composition of the invention, a solvent which is neither the primary amine nor secondary amine may be further blended in.

In the silver ink composition of the invention, an aliphatic hydrocarbon group bonded to a nitrogen atom of the primary or secondary amine is preferably a linear or branched alkyl group.

In the silver ink composition of the invention, the solvent preferably includes a monovalent alcohol having 2 to 5 carbon atoms.

In addition, according to the invention, a substrate is provided with a surface having thereon a metallic silver layer which is formed by heating the silver ink composition of the invention.

Advantageous Effects of Invention

According to the invention, it is possible to provide a silver ink composition suitable for forming a metallic silver layer which has superior glossiness and specularity, and a substrate with a surface on which a metallic silver layer is formed using the silver ink composition.

DESCRIPTION OF EMBODIMENTS

Silver Ink Composition

A silver ink composition of the invention is formed by blending one or more kinds of silver β-ketocarboxylates selected from the group consisting of silver isobutyrylacetate, silver benzoylacetate, silver propionylacetate, silver acetoacetate, silver α-methylacetoacetate (silver 2-methylacetoacetate), and silver α-ethylacetoacetate (silver 2-ethylacetoacetate), and an aliphatic primary or secondary amine having 1 to 10 carbon atoms.

Hereinafter, the respective blending components will be described.

<Silver β-Ketocarboxylate>

The above-described silver β-ketocarboxylates are decomposed by heating and form metallic silver. In addition, the concentrations of the raw material remaining in the formation of metallic silver and impurities are extremely low, whereby dullness and unevenness are suppressed on the surface of the formed metallic silver and thus the metallic silver has an excellent appearance such as superior specularity. Furthermore, the formed metallic silver is excellent in terms of the contact between silver atoms and has superior properties so that the conduction property is superior and the resistivity is low.

Table 1 shows the decomposition temperature, mass of the remaining silver β-ketocarboxylate after decomposition, and silver content (theoretical value) of the silver β-ketocarboxylate, which are obtained from the result of thermogravimetric analysis (TGA) of the silver β-ketocarboxylate. The mass of the remaining silver β-ketocarboxylate is calculated from the following Formula (1) and the silver content (theoretical value) is calculated from the following Formula (2).

Mass of Remaining Silver β-Ketocarboxylate (%) = $(A/B) \times 100$    (1)

[A represents the mass (mg) after thermal decomposition of silver β-ketocarboxylate, and B represents the amount (mg) of silver β-ketocarboxylate used in TGA]

Silver Content (%) = (Atomic Weight of Silver/Molecular Weight of Silver β-Ketocarboxylate) × 100    (2)

TABLE 1

| Silver β-Ketocarboxylates (used amount (mg)) | Decomposition Temperature (° C.) | Mass of Remaining Silver β-Ketocarboxylate (%) | Silver Content (%) |
|---|---|---|---|
| Silver Isobutyrylacetate (8.63) | 145 | 51.9 | 45.6 |
| Silver Benzoylacetate (5.35) | 120 | 70.9 | 39.9 |
| Silver Propionylacetate (5.24) | 130 | 55.6 | 48.4 |
| Silver Acetoacetate (6.77) | 110 | 53.0 | 51.6 |
| Silver α-Methylacetoacetate (6.18) | 95 | 55.8 | 48.4 |
| Silver α-Ethylacetoacetate (9.05) | 110 | 58.0 | 45.6 |

As shown in Table 1, the decomposition temperature of the silver β-ketocarboxylate is 145° C. or lower and extremely lower than those of the conventional metallic silver forming materials, whereby decomposition is rapidly performed and metallic silver is rapidly formed. In addition, since the mass (%) of the remaining silver β-ketocarboxylate after thermal decomposition exhibits a value close to the silver content (%, theoretical value), it is found that the silver β-ketocarboxylate is sufficiently decomposed at the decomposition temperature to form metallic silver.

The silver β-ketocarboxylates may be used alone or in combination with two or more kinds. When two or more kinds are used in combination, the combination and proportion thereof may be appropriately selected in accordance with the purpose.

The proportion of the blended amount of the silver β-ketocarboxylate in the total amount of the blending components is preferably 5 mass % to 50 mass %, and more preferably 15 mass % to 35 mass %.

The silver β-ketocarboxylate can be manufactured through a method including a process of forming silver β-ketocarboxylate by reacting β-ketocarboxylic acid and a silver compound in a reaction solution having a water content of preferably 55 mass % or less. The specific manufacturing method is as follows.

First, β-ketocarboxylate is prepared by hydrolyzing a β-ketocarboxylic acid ester. The ester is preferably hydrolyzed using a base such as sodium hydroxide (NaOH) and potassium hydroxide (KOH). The base is preferably used in the form of an aqueous solution, and at this time, the concentration is preferably 1 mol/liter (hereinafter, abbreviated as L) or greater, and more preferably 2 mol/L to 5 mol/L.

The used amount of the base is not particularly limited, but is preferably 0.8 mol to 2 mol, and more preferably 0.9 mol to 1.2 mol with respect to 1 mol of the β-ketocarboxylic acid ester.

The concentration of the β-ketocarboxylic acid ester in the reaction solution is preferably 0.5 mol/L to 6.25 mol/L, and more preferably 1 mol/L to 5.6 mol/L.

The reaction temperature is not particularly limited, but is preferably 50° C. or lower, more preferably 40° C. or lower, and particularly preferably 20° C. to 40° C.

The reaction time is preferably 0.5 hours to 48 hours, and more preferably 1 hour to 4 hours.

In this process, in order to sufficiently reduce the amount of the remaining base in the reaction solution after completion of the reaction, the used amount of the base is preferably set to be less than that of the β-ketocarboxylic acid ester. The used amount of the base is preferably 0.8 mol to 1 mol, and more preferably 0.8 mol to 0.9 mol with respect to 1 mol of the β-ketocarboxylic acid ester. This condition is preferable when the β-ketocarboxylate is isolated once and then used in the subsequent process. On the other hand, when the β-ketocarboxylate formed in this process is not isolated and directly used in the subsequent process, the used amount of the base is preferably 1 mol to 1.3 mol, and more preferably 1.1 mol to 1.2 mol with respect to 1 mol of the β-ketocarboxylic acid ester. In addition, in the subsequent process, an acid (sulfuric acid or the like to be described later) may be added in an amount equivalent to that of the base used.

The β-ketocarboxylic acid ester can be appropriately selected in accordance with the structure of the desired silver β-ketocarboxylate. Examples of the alkyl group constituting the ester include a methyl group, an ethyl group, an isopropyl group, a benzyl group, and the like. Specific examples of compounds thereof include methyl isobutyrylacetate, benzyl isobutyrylacetate, isopropyl isobutyrylacetate, ethyl benzoylacetate, methyl propionylacetate, methyl acetoacetate, ethyl 2-methylacetoacetate, ethyl 2-ethylacetoacetate, and the like.

In addition, the raw material is not limited to the β-ketocarboxylic acid ester, and for example, a cyclic compound which becomes the ester by ring-opening can also be used.

The obtained β-ketocarboxylate is determined by, for example, the kind of the base which is used, and examples thereof include sodium salt, potassium salt, ammonium salt, and the like. Specific examples of compounds thereof include sodium isobutyrylacetate, potassium isobutyrylacetate, ammonium isobutyrylacetate, sodium benzoylacetate, potassium benzoylacetate, ammonium benzoylacetate, sodium propionylacetate, potassium propionylacetate, ammonium propionylacetate, sodium acetoacetate, potassium acetoacetate, ammonium acetoacetate, sodium 2-methylacetoacetate, potassium 2-methylacetoacetate, ammonium 2-methylacetoacetate, sodium 2-ethylacetoacetate, potassium 2-ethylacetoacetate, ammonium 2-ethylacetoacetate, and the like.

The β-ketocarboxylate can be prepared by, for example, hydrolyzing the β-ketocarboxylic acid ester. The obtained β-ketocarboxylate may be isolated by a usual method, or directly used without being isolated when a silver compound is used in the subsequent process to be described later.

Next, silver β-ketocarboxylate is formed using the β-ketocarboxylate and silver compound. As such a method, first and second methods will be described below.

The first method is as follows.

First, an acid is added to the β-ketocarboxylate to form β-ketocarboxylic acid and the β-ketocarboxylic acid is extracted with an organic solvent. The acid is not particularly limited, but preferable examples thereof include a sulfuric acid, a hydrochloric acid, a hydrobromic acid, a nitric acid, a phosphoric acid, an acetic acid, and the like. The used amount of the acid is not particularly limited, and for example, it is preferable to supply protons ($H^+$) in an amount equivalent to the amount of a cation moiety constituting the salt of the β-ketocarboxylate. In addition, when the β-ketocarboxylate is directly used without being isolated in the previous process, it is preferable to supply protons ($H^+$) in an amount equivalent to the used amount of the base in the previous process.

By extracting the formed β-ketocarboxylic acid with an organic solvent, purity of the silver β-ketocarboxylate can be further improved.

For example, after being formed, the β-ketocarboxylic acid obtained in this process is preferably rapidly ice-cooled and used in the subsequent process.

Next, a silver compound is added to the β-ketocarboxylic acid to form silver β-ketocarboxylate.

At this time, the reaction is generally performed in a solvent, but in order to efficiently form silver β-ketocarboxylate, the amount of the water in the reaction solution is preferably reduced. That is, the rate of formation of the silver β-ketocarboxylate is relatively improved with a lower amount of water in the reaction solution. Specifically, the water content (mass %) in the reaction solution is preferably 55 mass % or less, more preferably 50 mass % or less, and particularly preferably 44 mass % or less. The lower limit value of the water content in the reaction solution is not particularly limited, but is preferably about 35 mass %, and more preferably a detection limit value or less.

Examples of the solvent in the reaction solution include an organic solvent such as ether, water, and the mixtures thereof.

The mixing ratio of the β-ketocarboxylic acid to the silver compound is not particularly limited, but is preferably 1 mol to 1.5 mol, and more preferably 1 mol to 1.2 mol of the β-ketocarboxylic acid with respect to 1 mol of the silver compound.

One kind of the β-ketocarboxylic acid and silver compound may be used, respectively, or two or more kinds of any one or both of the β-ketocarboxylic acid and silver compound may be used.

Generally, the β-ketocarboxylic acid is used in the form of a β-ketocarboxylic acid solution in which the β-ketocarboxylic acid is dissolved or dispersed in an organic solvent. The organic solvent is not particularly limited, and preferable examples thereof include esters such as ethyl acetate and ethers such as diethyl ether.

The concentration of the β-ketocarboxylic acid solution is not particularly limited, but is preferably 0.2 mol/L or greater, and more preferably 0.5 mol/L or greater.

Generally, the silver compound is used in the form of a silver compound solution (for example, silver compound aqueous solution). However, the concentration thereof is preferably 1 mol/L or greater, more preferably 2 mol/L or greater, and particularly preferably 3 mol/L or greater to reduce the water content in the reaction solution as described above. In addition, the upper limit value is not particularly limited, but is preferably 13 mol/L or less. In addition, when a hydrogen atom bonded to a carbon atom at an α-position of the formed silver β-ketocarboxylate is unsubstituted, the concentration of the silver compound solution is preferably 1 mol/L or greater, more preferably 1.5 mol/L, and particularly preferably 2 mol/L or greater. When the hydrogen atom bonded to the carbon atom at the α-position is substituted with a substituent, the concentration of the silver compound solution is preferably 3 mol/L or greater, more preferably 4 mol/L or greater, and particularly preferably 5 mol/L or greater.

The silver compound is not particularly limited, and examples thereof include silver nitrate, silver chloride, silver carbonate, silver bromide, silver iodide, and the like. Among them, silver nitrate is particularly preferable from the viewpoint of comparatively superior water solubility, stability, and safety.

In the reaction of the β-ketocarboxylic acid with the silver compound, in order to dissociate a carboxyl group (—COOH) in the β-ketocarboxylic acid into carboxylate (—COO⁻), for example, an amine such as diethanolamine, methylaminoethanol, dimethylaminoethanol, or triethanolamine may be added.

The added amount of the amine is not particularly limited, but is, for example, preferably 1 mol to 1.5 mol, and more preferably 1 mol to 1.1 mol with respect to 1 mol of the silver compound.

The β-ketocarboxylic acid moves from the organic layer to the aqueous layer due to the addition of the amine. Therefore, when the amine is added, for example, the concentration of the β-ketocarboxylic acid in the β-ketocarboxylic acid solution (for example, organic solvent solution) may not be particularly considered. In addition, the β-ketocarboxylic acid may be moved from the organic layer to the aqueous layer, and in this stage, only the aqueous layer may be separated to mix the β-ketocarboxylic acid aqueous solution (aqueous layer) with the silver compound solution (for example, silver compound aqueous solution) to thereby form silver β-ketocarboxylate.

Generally, the amine which is used in the reaction is added in the form of an amine solution (for example, amine aqueous solution), and the concentration of the amine solution is preferably 2 mol/L or greater, more preferably 4 mol/L or greater, and particularly preferably 6 mol/L to reduce the water content in the reaction solution as described above. In addition, the upper limit value is not particularly limited, but is preferably 8 mol/L or less.

The concentration of the β-ketocarboxylic acid in the reaction solution is preferably 0.1 mol/L to 5 mol/L, and more preferably 0.3 mol/L to 3 mol/L.

In addition, the concentration of the amine in the reaction solution is preferably 0.1 mol/L to 5 mol/L, and more preferably 0.3 mol/L to 3 mol/L.

In addition, the concentration of the silver compound in the reaction solution is preferably 0.1 mol/L or greater, more preferably 0.3 mol/L or greater, and particularly preferably 0.5 mol/L or greater when the hydrogen atom bonded to the carbon atom at the α-position of the formed silver β-ketocarboxylate is not substituted. On the other hand, when the hydrogen atom bonded to the carbon atom at the α-position is substituted with a substituent, the concentration of the silver compound in the reaction solution is preferably 0.1 mol/L or greater, more preferably 0.5 mol/L or greater, and particularly preferably 2 mol/L or greater.

The conditions in the reaction of the β-ketocarboxylic acid and the silver compound are not particularly limited. However, the reaction time is preferably 0.1 hours to 0.5 hours, and the reaction temperature is preferably 0° C. to 25° C.

The formed silver β-ketocarboxylate may be, for example, rapidly separated and dried after the reaction, but is preferably purified by washing with water or an alcohol such as ethanol.

Examples of the second method include a method of forming silver β-ketocarboxylate by directly adding a silver compound to β-ketocarboxylate. In this case, a β-ketocarboxylate solution (for example, β-ketocarboxylate aqueous solution) is preferably added to a silver compound solution (for example, silver compound aqueous solution). In addition, a silver compound may be added to a β-ketocarboxylate solution.

In addition, silver β-ketocarboxylate can also be manufactured through a method of forming silver β-ketocarboxylate including: forming β-ketocarboxylate; mixing an aqueous solution containing the β-ketocarboxylate with nitric acid to acidify the aqueous solution; and mixing the acidic aqueous solution with silver nitrate without extracting and removing auxiliary products from the acidic aqueous solution, in addition to the above-described methods.

<Aliphatic Primary or Secondary Amine Having 1 to 10 Carbon Atoms>

The amine, which is a blending component, is not particularly limited as long as it is an aliphatic primary or secondary amine having 1 to 10 carbon atoms. However, preferable examples thereof include amines (alkylamine, dialkylamine) in which an aliphatic hydrocarbon group bonded to a nitrogen atom is an alkyl group. The alkyl group may be linear, branched, or cyclic.

Examples of the linear or branched alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a 2-methylpentyl group, a 3-methylpentyl group, a 4-methylpentyl group, a 1,1-dimethylbutyl group, a 2,2-dimethylbutyl group, a 3,3-dimethylbutyl group, a 1,2-dimethylbutyl group, a 1,3-dimethylbutyl group, a 2,3-dimethylbutyl group, an n-heptyl group, an n-octyl group, a 2-ethylhexyl group, a nonyl group, a decyl group, and the like.

The cyclic alkyl group may be monocyclic or polycyclic, and examples thereof include a cyclopropyl group, a cyclobutyl group, a cyclopentyl group, a cyclohexyl group, a cycloheptyl group, a cyclooctyl group, a cyclononyl group, a cyclodecyl group, a norbornyl group, an isobornyl group, an adamantyl group, a tricyclodecyl group, and the like.

In the amines, the alkyl group bonded to the nitrogen atom is preferably linear or branched. The amines preferably have 2 to 9 carbon atoms, and more preferably 3 to 8 carbon atoms. Specific examples thereof include n-propylamine, n-butylamine, n-pentylamine, n-hexylamine, n-heptylamine, 2-ethylhexylamine, n-octylamine, N-methylhexylamine, N-ethylhexylamine, and the like.

The amines may be used alone or in combination with two or more kinds. When two or more kinds are used in combination, the combination and proportion thereof may be appropriately selected in accordance with the purpose.

The proportion of the blended amount of the amine in the total amount of the blending components is preferably 10 mass % to 70 mass %, and more preferably 30 mass % to 60 mass %.

<Solvent>

A solvent which is neither the primary amine nor secondary amine may be further blended in the silver ink composition of the invention. For example, the viscosity of the silver ink composition can be adjusted by blending the solvent in. The silver ink composition can be more stably applied by adjustment to a viscosity suitable for a silver ink composition application method to be described later.

The solvent is not particularly limited as long as the solvent does not react with the blending components. However, the boiling point of the solvent is preferably lower than the heating temperature of the silver ink composition to be described later.

Preferable examples of the solvent include alcohols, ketones, esters, and ethers.

The alcohols may be linear, branched, or cyclic, but are preferably linear or branched. In addition, the number of carbon atoms is preferably 1 to 7, and more preferably 2 to 5. When the alcohols are cyclic, these may be monocyclic or polycyclic.

In addition, the alcohols may be monovalent or multivalent.

Preferable examples of the alcohols include monovalent or multivalent alcohols having 2 to 5 carbon atoms. Specific examples thereof include monovalent alcohols such as ethanol, 1-propanol, 2-propanol, 1-butanol, 2-butanol, 2-methyl-1-propanol, 2-methyl-2-propanol, and 1-pentanol; and divalent alcohols such as ethylene glycol and propylene glycol.

The ketones may be linear, branched, or cyclic, but are preferably linear or branched. In addition, the number of carbon atoms is preferably 3 to 12. When the ketones are cyclic, these may be monocyclic or polycyclic.

Preferable examples of the ketones include pentanone, 2,4-dimethyl-3-pentanone, 2,6-dimethyl-4-heptanone, undecanone, and the like.

The esters preferably have 3 to 10 carbon atoms. In addition, the group which is bonded to an oxygen atom (—O—) adjacent to a carbonyl group (—C(=O)—) which forms an ester bond (—C(=O)—O—) is preferably an alkyl group or an alkoxyalkyl group, and more preferably an alkoxyalkyl group.

Preferable examples of the esters include acetate esters, and specific examples thereof include 2-ethoxyethyl acetate and 2-butoxyethyl acetate.

The ethers may be linear, branched, or cyclic, and the number of carbon atoms is preferably 2 to 8.

Preferable examples of the ethers include chain-like ethers such as diethyl ether and bis(2-methoxyethyl)ether; and cyclic ethers such as tetrahydrofuran (THF).

The solvents may be used alone or in combination with two or more kinds. When two or more kinds are used in combination, the combination and proportion thereof may be appropriately selected in accordance with the purpose.

The proportion of the blended amount of the solvent in the total amount of the blending components is preferably 5 mass % to 50 mass %, and more preferably 10 mass % to 35 mass %.

<Other Components>

In addition to the silver β-ketocarboxylate, the amine, and the solvent, other components than these may be blended in the silver ink composition of the invention.

Preferable examples of the other components include acetylene alcohols. Here, "acetylene alcohols" indicate compounds having both of an ethynyl group (—C≡CH) and a hydroxyl group (—OH) and have, for example, a hydroxyl group, but are distinguished from the solvent.

The acetylene alcohols are preferably represented by the following Formula (II).

(II)

In Formula (II), each of R' and R" independently represents an alkyl group, a phenyl group, or a phenyl group which may have a substituent, which have 1 to 20 carbon atoms.

The alkyl group may be linear, branched, or cyclic.

Examples of the substituent which may be possessed by the phenyl group include a saturated or unsaturated monovalent aliphatic hydrocarbon group having 1 to 16 carbon atoms, a monovalent group in which the aliphatic hydrocarbon group is bonded to an oxygen atom, a fluorine atom, a chlorine atom, a bromine atom, a hydroxyl group, a cyano group, a phenoxy group, and the like.

The aliphatic hydrocarbon group as the substituent may be linear, branched, or cyclic, and examples thereof include an alkyl group, an alkenyl group, an alkynyl group, a cycloalkyl group, a cycloalkenyl group, and the like. When the aliphatic hydrocarbon group is cyclic, it may be monocyclic or polycyclic.

Preferable examples of the monovalent group in which the aliphatic hydrocarbon group is bonded to an oxygen atom include an alkoxy group, an alkenyloxy group, an alkynyloxy group, a cycloalkoxy group, a cycloalkenyloxy group, and the like.

When the phenyl group has a substituent, the position and the number of the substituents are not particularly limited.

R' and R" are preferably alkyl groups having 1 to 20 carbon atoms, and more preferably linear or branched alkyl groups having 1 to 10 carbon atoms.

When the other components have a liquid form, the boiling point thereof is preferably lower than the heating temperature of the silver ink composition to be described later.

The other components may be used alone or in combination with two or more kinds. When two or more kinds are used in combination, the combination and proportion thereof may be appropriately selected in accordance with the purpose.

The blended amounts of the other components may be appropriately adjusted in accordance with the kinds thereof, and are not particularly limited.

In the silver ink composition of the invention, the proportions of the blended amounts of the silver β-ketocarboxylate and the amine, which are essential components, and the solvent, which is an optional component, are as described above, but the proportion of the total blended amount of these components in the total amount of the blending components is preferably 70 mass % or greater, and more preferably 85 mass % or greater, and may also be 100 mass %.

In the silver ink composition of the invention, since a specific, limited combination is selected for the silver β-ketocarboxylate and the amine, a metallic silver layer can be formed rapidly at low temperature, and a metallic silver layer can be provided with a surface having superior glossiness and specularity. For example, as described above, Japanese Unexamined Patent Application, First Publication Nos. 2009-114232 and 2009-197133 disclose that metallic silver having a superior conductive property and superior stability can be formed at low temperature using an ink composition in which silver β-ketocarboxylate and a compound having a lone pair are blended. However, the Patent Documents disclose that in order to obtain a desired effect, it is necessary to select a combination limited to a certain degree regarding the silver β-ketocarboxylate and the compound having a lone pair. In addition, means for improving the glossiness and the specularity of the surface of the metallic silver layer is not disclosed. In order to improve the conductive property and the stability of the metallic silver layer, it is thought that it is necessary to sufficiently bring the silver atoms into contact with each other, but in order to improve the glossiness and the specularity, it is thought that that is not enough. The inventors have achieved an improvement in glossiness and specularity of the metallic silver layer by selecting a further limited combination of the silver β-ketocarboxylate and the amine as the blending components. In addition, it is thought that the combination effect can be further improved by combining the solvent. The combination of the blending components in the invention cannot be easily selected even with reference to a very large number of examples of the blending components of the above-described Patent Documents, which do not disclose the object of the invention.

<Silver Ink Composition Manufacturing Method>

The silver ink composition of the invention can be manufactured by blending the silver β-ketocarboxylate, the amine, and if necessary, the solvent and the other components.

When the components are blended, all of the components may be added and then mixed, some of them may be sequentially added while being mixed, or all of the components may be sequentially added while being mixed.

The mixing method is not particularly limited, and may be appropriately selected from known methods such as a method of performing mixing by rotating a stiffing bar or a stiffing blade, a method of performing mixing using a mixer, and a method of performing mixing by applying ultrasonic waves.

All of the blending components may be dissolved in the silver ink composition, or some or all of the components may not be dissolved, but dispersed.

The temperature at the time of blending is not particularly limited as long as the blending components do not deteriorate, but is preferably $-5°$ C. to $30°$ C.

<Substrate>

A substrate of the invention has a surface on which a metallic silver layer which is formed by heating the silver ink composition of the invention is provided.

The silver β-ketocarboxylate in the silver ink composition is decomposed by heating and forms metallic silver. The metallic silver layer formed on the substrate has superior glossiness and color saturation, whereby dullness and unevenness are suppressed and thus the metallic silver layer has an excellent appearance such as superior specularity.

The material of the substrate may be appropriately selected in accordance with the purpose, and is not particularly limited. Specific examples thereof include inorganic compounds such as ceramics and quartz glass; organic compounds such as various resins; and papers.

The resin is preferably a synthetic resin, and examples thereof include polyethylene, polypropylene, polyvinyl chloride, polystyrene, polyvinyl acetate, acrylic resin, AS resin, ABS resin, polyamide, polyacetal, polyethylene terephthalate, polybutylene terephthalate, polytrimethylene terephthalate, polyethylene naphthalate, polybutylene naphthalate, polyphenylene sulfide, polysulfone, polycarbonate, epoxy resin, melamine resin, phenol resin, urea resin, polyurethane, polyimide, and the like.

Examples of the papers include base paper, art paper, coated paper, cast-coated paper, resin-coated paper, glassine paper, glossy paper, synthetic paper, and the like.

Since the silver β-ketocarboxylate has a low decomposition temperature, a substrate having low heat resistance, which cannot be used in the conventional methods requiring the high-temperature process, can also be used.

The substrate may have a single-layer structure or a multi-layer structure. In the case of the multi-layer structure, the materials of the plurality of substrates may be the same, or some or all of them may be different from each other. When using the plurality of substrates whose materials are different from each other, the combination and proportion thereof may be appropriately selected in accordance with the purpose.

The thickness of the substrate can be optionally set in accordance with the material or the purpose, and is not particularly limited. Generally, the thickness is preferably 10 μm to 15000 μm.

The metallic silver layer can be formed by applying and heating the silver ink composition on the substrate.

The silver ink composition application method is not particularly limited and known methods such as screen printing; offset printing; dip-type methods; inkjet-type methods; dispenser-type methods; methods using various coaters such as an air knife coater, a curtain coater, a die coater, a blade coater, a roll coater, a gate roll coater, a bar coater, a rod coater, a gravure coater, and a spin coater; and methods using a device such as a wire bar may be employed. When the application method is selected in accordance with, for example, the viscosity of the silver ink composition, the silver ink composition can be more stably applied.

The applied amount of the silver ink composition is not particularly limited, and may be appropriately adjusted in accordance with, for example, a blending ratio of the silver β-ketocarboxylate in the silver ink composition, a target thickness of the metallic silver layer, and the like.

The thickness of the metallic silver layer can be optionally set in accordance with the purpose. Generally, the thickness is preferably 0.1 μm to 1 μm.

Heating the silver ink composition is preferably started after the silver ink composition is applied and before the composition and properties of the composition change. In this manner, a metallic silver layer with a surface having more superior glossiness can be formed. Here, "change in composition" indicates that for example, some of the components are eliminated due to volatilization of the volatile components such as the amine and the solvent, or new components are added due to moisture absorption and the like, and as a result, the kinds or proportions of the contained components clearly change. In addition, "change in properties" indicates that for example, some of the dissolved components precipitate, or do not precipitate but separate, and as a result, the appearance clearly changes.

The time from when the application of the silver ink composition is completed to when the heating is started may be adjusted in accordance with the combination of the blending components of the silver ink composition.

The heating temperature of the silver ink composition may be appropriately adjusted in accordance with the decomposition temperature of the silver β-ketocarboxylate. For example, the heating temperature may be the same as, higher than, or lower than the decomposition temperature of the silver β-ketocarboxylate. Here, "decomposition temperature of silver β-ketocarboxylate" indicates a decomposition temperature when the silver β-ketocarboxylate is present alone. Accordingly, when a promoting component is blended in the silver ink composition to promote the decomposition during the heating of the silver β-ketocarboxylate, the silver β-ketocarboxylate is decomposed at a temperature lower than the decomposition temperature. It is thought that the promoting component corresponds to any or all of the amines which are blending components.

Generally, the heating temperature of the silver ink composition is preferably $+0°$ C. to $+60°$ C. with respect to the decomposition temperature of the silver β-ketocarboxylate. In addition, when the promoting component is blended in the silver ink composition, the lower limit value of the heating temperature of the silver ink composition may be about $-30°$ C. with respect to the decomposition temperature of the silver β-ketocarboxylate. By setting the heating temperature in this manner, the silver β-ketocarboxylate can be more securely decomposed.

The silver β-ketocarboxylate is sufficiently thermally decomposed at low temperature. Therefore, this is different as compared to, for example, the conventional metallic silver forming methods in which silver oxide is heated in the presence of a reductant, and it is not necessary to use the reductant. Accordingly, the kinds of the blending components of the silver ink composition can be reduced. The required heating temperature is also sufficiently low as described above.

The silver ink composition heating method is not particularly limited, and examples thereof include heating using an electric furnace, heating using a heat-sensitive heating head, and the like. In addition, heating may be performed in the air or under an inert gas atmosphere. Heating may also be performed under ordinary pressure or reduced pressure.

The heating time may be appropriately set in accordance with the heating temperature or the heating method, and is not particularly limited.

EXAMPLES

Hereinafter, the invention will be described in more detail with specific examples. However, the invention is not limited to the following examples.

Manufacturing Example 1

Synthesis of Silver α-Methylacetoacetate

While sodium hydroxide (1.92 g) was dissolved in water (8 ml) and stirred at room temperature, ethyl 2-methylacetoacetate (manufactured by Wako Pure Chemical Industries, Ltd., 5.77 g) was added dropwise and further stirred for 30 minutes. Thereafter, ethanol was removed using a rotary evaporator and the remaining aqueous layer was washed with ether. Ether (20 ml) was added thereto, and during further stirring under an ice-cooling environment, 2.35 g of a concentrated sulfuric acid dissolved in 8 ml of water was added dropwise. The ether layer was separated, the aqueous layer was salted-out, and then ether extraction was performed. The ether layer was collected and an ether solution of α-methylacetoacetate was obtained.

Diethanolamine (4.4 g) was dissolved in water (5 ml), and this solution was added to the ether solution of α-methylacetoacetate under an ice-cooling environment. Next, silver nitrate (6.8 g) dissolved in water (8 ml) was added dropwise. The precipitated white precipitate was filtered out and washed with ice water and then washed with isopropanol and dried, thereby obtaining silver α-methylacetoacetate as a white precipitate (yield: 4.78 g).

Figure 1:
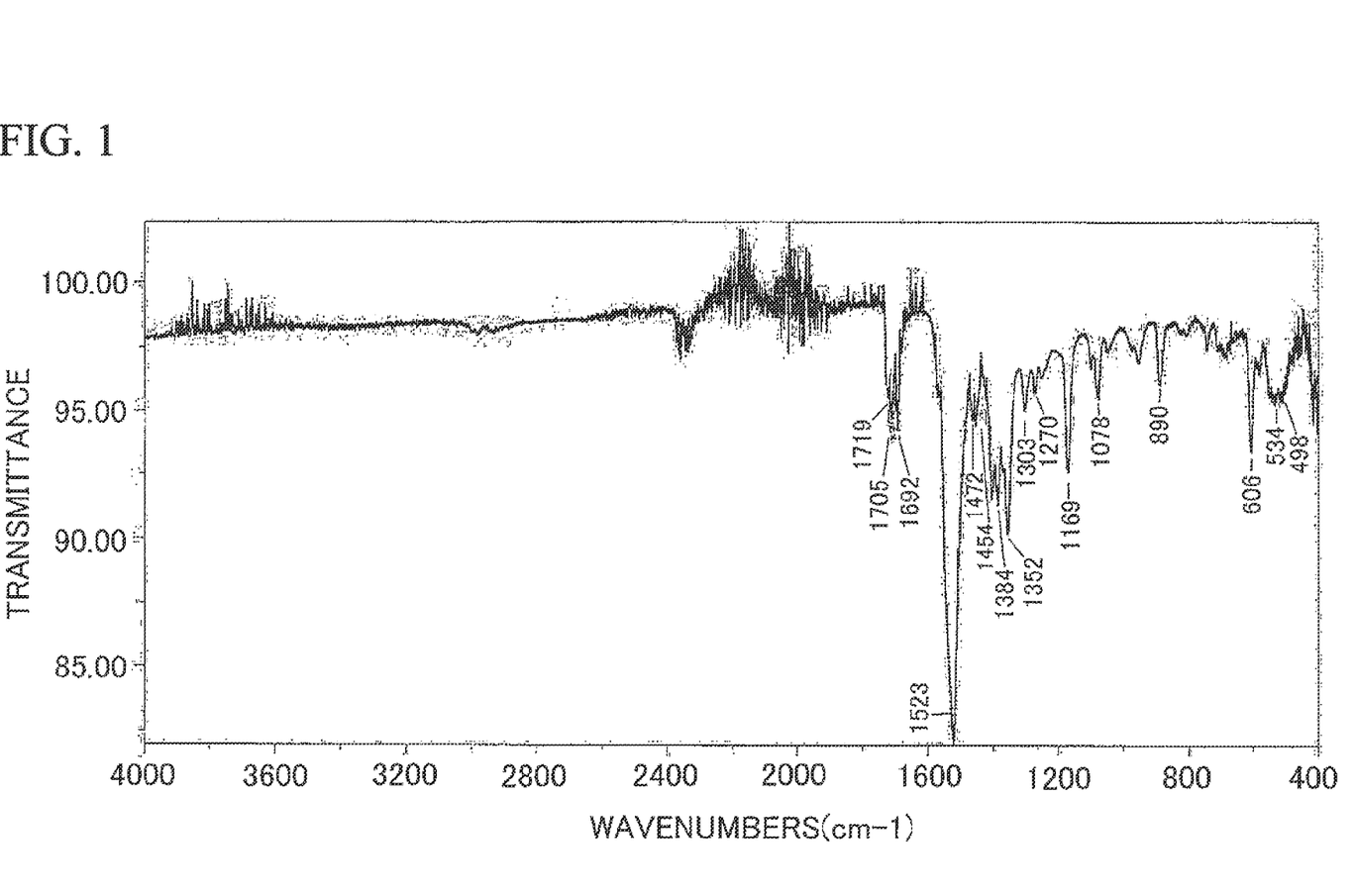
FIG. 1 is a diagram illustrating an infrared absorption spectrum (IR) of silver α-methylacetoacetate obtained in Manufacturing Example 1.

An infrared absorption spectrum (IR) of the obtained silver α-methylacetoacetate is shown in FIG. 1.

IR: 1692 $cm^{-1}$, 1523 $cm^{-1}$

In addition, elementary analysis values and data of an NMR (used solvent: heavy DMSO) spectrum of the obtained silver α-methylacetoacetate are shown as follows.

Elementary Analysis Values: C=26.49%, H=3.11%, Ag=48.91% (theoretical values: C=26.93%, H=3.16%, Ag=48.36%)

NMR: 1.25 ppm 3H d, 2.25 ppm 3H s, 3.55 ppm 1H q, J=7 Hz

Manufacturing Example 2

Synthesis of Silver Isobutyrylacetate

Sodium hydroxide (0.4 g) was dissolved in water (10 ml) and methyl isobutyrylacetate (manufactured by Fluka Corp., 1.44 g) was added thereto and stirred for 6 hours at room temperature. The reaction product was washed with ether and ether extraction was performed by adding a 10%-dilute sulfuric acid (4.9 g). An excess of anhydrous sodium sulfate was added to the ether extract, drying was performed thereon, and the anhydrous sodium sulfate was removed by filtering. In addition, the ether was removed using a rotary evaporator and an isobutyrylacetic acid was obtained (yield: 1 g).

Diethanolamine (0.33 g) was dissolved in water (5 ml) and an ether solution (10 ml) containing the isobutyrylacetic acid (0.43 g) was added thereto. Next, while stirring the obtained mixture at 15° C., an aqueous solution (5 ml) containing silver nitrate (0.51 g) was added dropwise thereto and further stirred for 15 minutes. The precipitated white precipitate was filtered out, thereby obtaining silver isobutyrylacetate (yield: 0.37 g).

Figure 2:
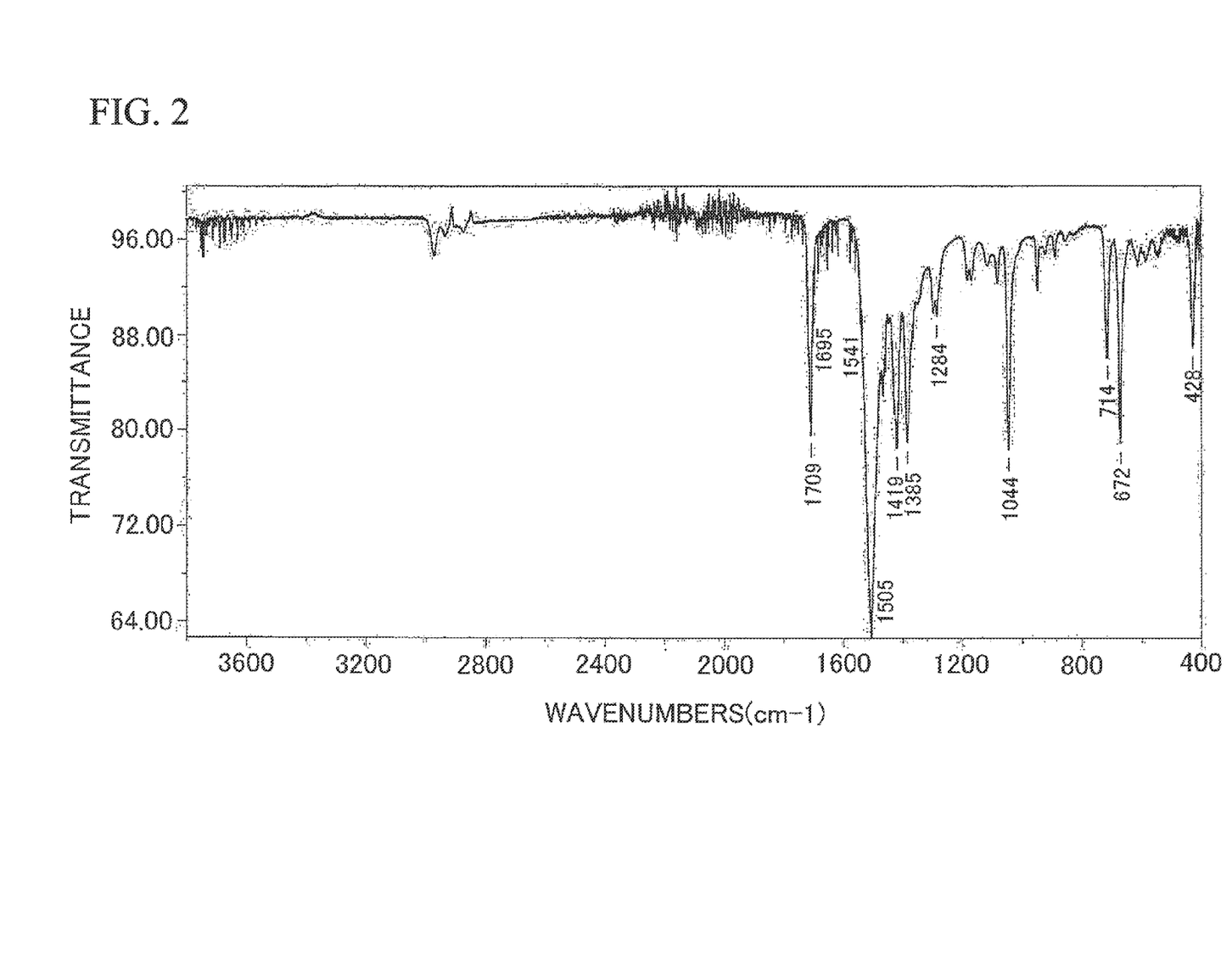
FIG. 2 is a diagram illustrating an infrared absorption spectrum (IR) of silver isobutyrylacetate obtained in Manufacturing Example 2.

An infrared absorption spectrum (IR) of the obtained silver isobutyrylacetate is shown in FIG. 2.

IR: 1709 $cm^{-1}$, 1505 $cm^{-1}$

In addition, elementary analysis values and data of an NMR (used solvent: heavy DMSO) spectrum of the obtained silver isobutyrylacetate are shown as follows.

Elementary Analysis Values: C, 30.33; H, 3.65; N, 0.00, Ag 45.42 (calculated values: C, 30.41; H 3.84; Ag, 45.51)

NMR: 1.00 ppm 6H d, 2.83 ppm 1H quintuplet line, 3.30 ppm 2H s, J=7 Hz

Manufacturing Example 3

Synthesis of Silver Benzoylacetate

Sodium hydroxide (0.4 g) was dissolved in water (10 ml) and ethyl benzoylacetate (manufactured by Aldrich, 2.14 g: purity 90%) was added thereto and stirred at room temperature overnight. The reaction product was washed with ether and ether extraction was performed by adding a 10%-dilute sulfuric acid (4.9 g). An excess of anhydrous sodium sulfate was added to the ether extract, drying was performed thereon, and the anhydrous sodium sulfate was removed by filtering. In addition, the ether was removed using a rotary evaporator and a benzoylacetic acid was obtained (yield: 1.05 g).

Diethanolamine (0.33 g) was dissolved in water (5 ml) and an ether solution (20 ml) containing the benzoylacetic acid (0.54 g) was added thereto. Next, while stirring the obtained mixture at 15° C., a solution (5 ml) containing silver nitrate (0.51 g) was added dropwise thereto and further stirred for 15 minutes. The precipitated light-yellow precipitate was filtered out, thereby obtaining silver benzoylacetate (yield: 0.79 g).

Figure 3:
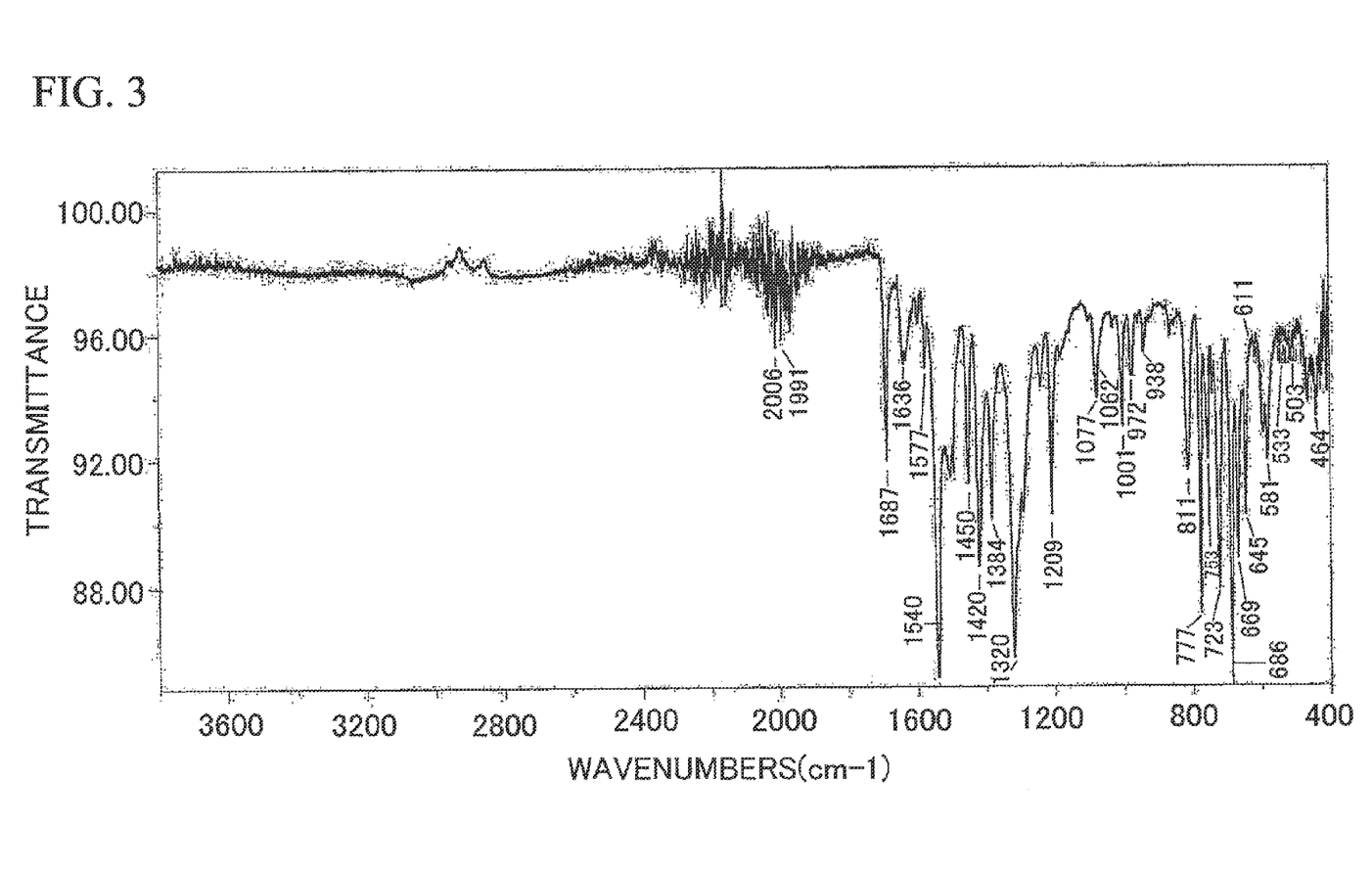
FIG. 3 is a diagram illustrating an infrared absorption spectrum (IR) of silver benzoylacetate obtained in Manufacturing Example 3.

An infrared absorption spectrum (IR) of the obtained silver benzoylacetate is shown in FIG. 3.

IR: 1687 $cm^{-1}$, 1540 $cm^{-1}$

In addition, data of an NMR (used solvent: heavy DMSO) spectrum of the obtained silver benzoylacetate is shown as follows.

NMR: 3.55 ppm 2H s, 7.45 to 8.00 ppm 5H m

Manufacturing Example 4

Synthesis of Silver Acetoacetate

Sodium hydroxide (NaOH) (15.8 g) was dissolved in water (213.8 g) under a water-cooling environment and the temperature of the obtained sodium hydroxide aqueous solution was adjusted to room temperature. The entire amount of this solution was added dropwise to ethyl acetoacetate at 20° C. (manufactured by Inoue Perfumery Mfg. Co., Ltd., 51.5 g) over 20 minutes and further stirred at 20° C. overnight to perform hydrolysis.

Next, while a solution containing the obtained sodium acetoacetate was cooled to 5° C. to 10° C., a 69%-nitric acid ($HNO_3$) aqueous solution (1.73 g) was added dropwise thereto over 5 minutes and further stirred for about 10 minutes. At this time, the pH of the obtained reaction solution was 5.

Next, silver nitrate (AgNO₃) (47.8 g) was dissolved in water (47.8 g). While cooling this solution to 5° C. to 10° C., the entire amount of the reaction solution at pH 5 was added dropwise thereto over 15 minutes and further stirred for about 10 minutes, thereby forming silver acetoacetate.

Next, the obtained reaction solution was centrifugally filtered to obtain crystals and the crystals were washed once with water (40 mL) and then washed three times with an appropriate amount of ethanol. These were dried, thereby obtaining target crystals (white crystals) of silver acetoacetate (yield: 41.2 g, yield: 70%).

Figure 4:
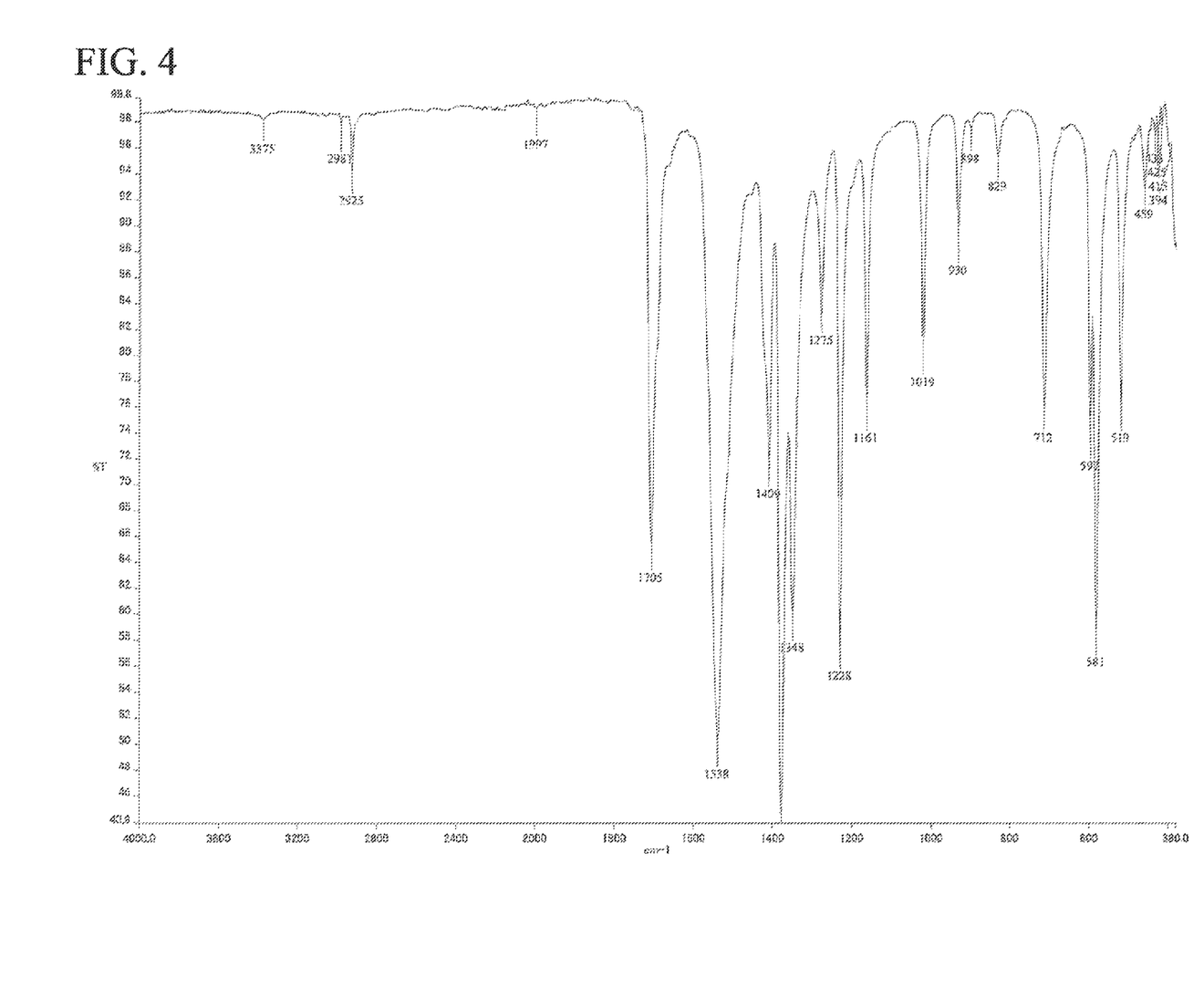
FIG. 4 is a diagram illustrating an infrared absorption spectrum (IR) of silver acetoacetate obtained in Manufacturing Example 4.

An infrared absorption spectrum (IR) of the obtained silver acetoacetate is shown in FIG. 4.

IR: 1705 cm$^{-1}$, 1538 cm$^{-1}$

In addition, data of an NMR (used solvent: heavy DMSO) spectrum of the obtained silver acetoacetate is shown as follows.

NMR: 2.17 ppm 3H s, 3.25 ppm 2H s

Example 1

Manufacturing of Silver Ink Composition 40 g of n-propylamine and 20 g of ethanol were added to a 100-ml beaker. These were cooled with an ice-water bath and stirred. In addition, 20 g of silver α-methylacetoacetate was added thereto and stirring was performed until all of the blending components were dissolved. Thus, a silver ink composition was manufactured. The blending components are shown in Table 2.

<Manufacturing of Substrate Having Metallic Silver Layer Formed Thereon>

The obtained silver ink composition was uniformly applied using a spin coater method such that 12 drops of the composition were added dropwise at substantially equal intervals on a surface of a substrate (manufactured by HYNT, HK31WF) having a vertical size of 50 mm, a horizontal size of 50 mm, and a thickness of 188 μm which was made of polyethylene terephthalate and then the substrate was rotated.

Next, the substrate was heated instantly (after about 15 seconds from the completion of the application) for 5 minutes at about 150° C., thereby forming a metallic silver layer on the surface of the substrate.

<Evaluation of Characteristics of Metallic Silver Layer>

(1) Appearance, (2) Glossiness, (3) Color Saturation of the obtained metallic silver layer were evaluated using the following methods, respectively.

(1) Appearance

Degrees of (a) Specularity, (b) Dullness, and (c) Unevenness were evaluated in accordance with the following evaluation standards through observation with the naked eye, respectively. The evaluation results are shown in Table 3.

◎: Very superior
○: Superior
Δ: Normal. There is no problem in practical use.
×: There is a problem in practical use.

(2) Glossiness

Using micro-TR1-gloss geometry 85° (BYK-Gardver, manufactured by GmbH), evaluation was performed using a usual method.

(3) Color Saturation

Using a spectrophotometer (manufactured by X-Rite Inc.), evaluation was performed using a usual method.

Examples 2 to 14, Comparative Examples 1 to 3

Silver ink compositions were manufactured in the same manner as in Example 1, except that silver β-ketocarboxylates, amines, and solvents shown in Table 2 were used, respectively. Substrates having a metallic silver layer formed thereon were manufactured in the same manner as in Example 1 and characteristics of the metallic silver layer were evaluated. The evaluation results are shown in Table 3.

"Duomeen CD" in Comparative Example 3 indicates N-coco alkyl-1,3-diaminopropane. In addition, in Example 10, a mixed solvent of ethanol (10 g)/tetrahydrofuran (10 g) was used in place of ethanol (20 g). In Example 14, a mixed solvent of ethanol (14 g)/2,6-dimethyl-4-heptanone (6 g) was used in place of ethanol (20 g).

TABLE 2

| | Silver β-Ketocarboxylate | Amine | Solvent |
|---|---|---|---|
| Example 1 | silver α-methylacetoacetate | n-propylamine | ethanol |
| Example 2 | silver α-methylacetoacetate | n-butylamine | ethanol |
| Example 3 | silver α-methylacetoacetate | n-pentylamine | ethanol |
| Example 4 | silver α-methylacetoacetate | n-hexylamine | ethanol |
| Example 5 | silver α-methylacetoacetate | 2-ethylhexylamine | ethanol |
| Example 6 | silver α-methylacetoacetate | n-octylamine | ethanol |
| Example 7 | silver α-methylacetoacetate | N-methylhexylamine | ethanol |
| Example 8 | silver α-methylacetoacetate | 2-ethylhexylamine | methanol |
| Example 9 | silver α-methylacetoacetate | 2-ethylhexylamine | 1-butanol |
| Example 10 | silver α-methylacetoacetate | 2-ethylhexylamine | ethanol/tetrahydrofuran (1/1, mass ratio) |
| Example 11 | silver isobutyrylacetate | 2-ethylhexylamine | ethanol |
| Example 12 | silver benzoylacetate | 2-ethylhexylamine | ethanol |
| Example 13 | silver α-methylacetoacetate | 2-ethylhexylamine | — |
| Example 14 | silver α-methylacetoacetate | 2-ethylhexylamine | ethanol/2,6-dimethyl-4-heptanone (7/3, mass ratio) |
| Comparative Example 1 | silver α-methylacetoacetate | 2-phenylethylamine | ethanol |
| Comparative Example 2 | silver α-methylacetoacetate | triethylamine | ethanol |
| Comparative Example 3 | silver α-methylacetoacetate | Duomeen CD | ethanol |

TABLE 3

| | Glossiness | Color Saturation | | | Appearance | | |
|---|---|---|---|---|---|---|---|
| | | L | a | b | Specularity | Dullness | Unevenness |
| Example 1 | 142.7 | 85.79 | 0.96 | 9.13 | ○ | Δ | ○ |
| Example 2 | 130.8 | 75.98 | −0.85 | 5.76 | ○ | ○ | ○ |
| Example 3 | 132.4 | 73.71 | 1.03 | 8.95 | ○ | ○ | ○ |
| Example 4 | 129.5 | 72.77 | 2.14 | 3.78 | Δ | Δ | Δ |
| Example 5 | 155.6 | 97.25 | −0.39 | 3.61 | ◎ | ◎ | ◎ |
| Example 6 | 145.2 | 86.04 | 2.71 | 19.17 | ○ | ○ | Δ |
| Example 7 | 120.3 | 71.86 | −1.01 | 6.11 | Δ | Δ | ○ |
| Example 8 | 157.4 | 97.23 | −0.41 | 3.47 | ◎ | ◎ | ◎ |
| Example 9 | 152.6 | 96.43 | −0.84 | 5.74 | ◎ | ◎ | ◎ |
| Example 10 | 151.4 | 94.65 | −0.74 | 9.46 | ◎ | ○ | Δ |
| Example 11 | 125.6 | 81.58 | −6.86 | −6.60 | ◎ | ◎ | ◎ |
| Example 12 | 133.7 | 75.93 | 3.60 | 11.91 | ○ | Δ | Δ |
| Example 13 | 156.1 | 97.24 | −0.40 | 3.50 | ◎ | ◎ | ◎ |

TABLE 3-continued

| | Glossi-ness | Color Saturation | | | Appearance | | |
|---|---|---|---|---|---|---|---|
| | | L | a | b | Specularity | Dullness | Unevenness |
| Example 14 | 157.0 | 97.23 | −0.41 | 3.55 | ◎ | ◎ | ◎ |
| Comparative Example 1 | 112.5 | 69.32 | 10.15 | 8.89 | X | X | X |
| Comparative Example 2 | 99.9 | 74.47 | −0.84 | 14.21 | X | X | X |
| Comparative Example 3 | — | — | — | — | ○ | Δ | X |

As shown in Tables 2 and 3, the metallic silver layers formed using the silver ink compositions of Examples 1 to 14 were excellent in terms of all of the appearance, glossiness, and color saturation.

On the other hand, in the cases of the silver ink composition of Comparative Example 1 formed using 2-phenylethylamine as an amine and the silver ink composition of Comparative Example 2 formed using aliphatic tertiary amine as an amine, the metallic silver layers had low glossiness and their appearances were not permissible in practical use.

In addition, in the case of the silver ink composition of Comparative Example 3 formed using Duomeen CD as an amine, Duomeen CD remained on the metallic silver layer and it was not possible to measure the glossiness and color saturation.

Examples 15 to 21, Comparative Examples 4 and 5

Silver ink compositions were manufactured in the same manner as in Example 1, except that silver acetoacetate was used as silver β-ketocarboxylate and amines shown in Table 4 were used, respectively. Substrates having a metallic silver layer formed thereon were manufactured in the same manner as in Example 1 and characteristics of the metallic silver layer were evaluated. The evaluation results are shown in Table 5.

TABLE 4

| | Silver β-Ketocarboxylate | Amine | Solvent |
|---|---|---|---|
| Example 15 | silver acetoacetate | n-propylamine | ethanol |
| Example 16 | silver acetoacetate | n-butylamine | ethanol |
| Example 17 | silver acetoacetate | n-pentylamine | ethanol |
| Example 18 | silver acetoacetate | n-hexylamine | ethanol |
| Example 19 | silver acetoacetate | 2-ethylhexylamine | ethanol |
| Example 20 | silver acetoacetate | n-octylamine | ethanol |
| Example 21 | silver acetoacetate | N-methylhexylamine | ethanol |
| Comparative Example 4 | silver acetoacetate | 2-phenylethylamine | ethanol |
| Comparative Example 5 | silver acetoacetate | triethylamine | ethanol |

TABLE 5

| | Glossi-ness | Color Saturation | | | Appearance | | |
|---|---|---|---|---|---|---|---|
| | | L | a | b | Specularity | Dullness | Unevenness |
| Example 15 | 119.9 | 70.81 | −0.93 | −0.15 | ○ | ○ | Δ |
| Example 16 | 120.0 | 66.15 | −0.95 | −2.05 | ○ | Δ | ○ |
| Example 17 | 110.4 | 65.52 | −1.31 | −5.02 | ◎ | ◎ | ○ |
| Example 18 | 90.0 | 73.28 | −5.70 | −9.21 | ○ | Δ | Δ |
| Example 19 | 142.0 | 96.92 | −0.42 | 5.37 | ◎ | ◎ | ◎ |
| Example 20 | 120.0 | 81.17 | −8.31 | 4.89 | ◎ | ◎ | ○ |
| Example 21 | 119.0 | 66.08 | −5.97 | −0.40 | ○ | Δ | ○ |
| Comparative Example 4 | 87.7 | 58.94 | 10.27 | 13.22 | Δ | Δ | X |
| Comparative Example 5 | 44.5 | 71.31 | −3.25 | 2.54 | X | X | X |

As shown in Tables 4 and 5, the metallic silver layers formed using the silver ink compositions of Examples 15 to 21 were excellent in terms of all of the appearance, glossiness, and color saturation.

On the other hand, in the cases of the silver ink composition of Comparative Example 4 formed using 2-phenylethylamine as an amine and the silver ink composition of Comparative Example 5 formed using aliphatic tertiary amine as an amine, the metallic silver layers had low glossiness and their appearances were not permissible in practical use.

Even when using different kinds of silver β-ketocarboxylates, results similar to those of Examples 1 to 14 and Comparative Examples 1 and 2 were obtained.

INDUSTRIAL APPLICABILITY

The present invention can be used in fields of substrates provided with a metallic silver layer for decoration and specular surfaces.

The invention claimed is:

1. A silver ink composition, which comprises one of (i) to (xiii) selected from the group consisting of
    (i) a combination of silver α-methylacetoacetate and n-butylamine,
    (ii) a combination of silver α-methylacetoacetate and n-pentylamine,
    (iii) a combination of silver α-methylacetoacetate and n-octylamine,
    (iv) a combination of silver α-methylacetoacetate and N-methylhexylamine,
    (v) a combination of silver isobutyrylacetate and 2-ethylhexylamine,
    (vi) a combination of silver benzoylacetate and 2-ethylhexylamine,
    (vii) a combination of silver acetoacetate and n-propylamine,
    (viii) a combination of silver acetoacetate and n-butylamine,
    (ix) a combination of silver acetoacetate and n-pentylamine,
    (x) a combination of silver acetoacetate and n-hexylamine,
    (xi) a combination of silver acetoacetate and 2-ethylhexylamine,
    (xii) a combination of silver acetoacetate and n-octylamine, and
    (xiii) a combination of silver acetoacetate and N-methylhexylamine,
wherein the silver acetate described in (i) to (xiii) is present in 35 mass % to 50 mass % of the total composition and the amine described in (i) to (xiii) is present in 30 mass % to 60 mass % of the total composition.

2. The silver ink composition according to claim 1, wherein a solvent which is neither the primary amine nor secondary amine is further blended in the composition.

3. The silver ink composition according to claim 2, wherein the solvent includes a monovalent alcohol having 2 to 5 carbon atoms.

4. The silver ink composition according to claim 1, wherein the silver ink composition is a silver ink composition for decoration or formation of specular surfaces.

5. The silver ink composition according to claim 2, wherein the solvent is selected from the group consisting of ethanol, methanol, 1-butanol, tetrahydrofuran, 2,6-dimethyl-4-heptanone, and combinations thereof.

6. The silver ink composition according to claim 2, wherein the blended amount of the solvent is 0 to 35 mass % of the total composition.

7. The silver ink composition according to claim 5, wherein the ink composition consists of one of (i) to (xiii) and the solvent.

8. A substrate with a surface on which a metallic silver layer is provided which is formed by coating and heating a silver ink composition and has 90.0 to 157.4 glossiness measured by micro-TRI-gloss geometry 85°, wherein, the silver ink composition comprises one of (i) to (xiii) selected from the group consisting of
   (i) a combination of silver α-methylacetoacetate and n-butylamine,
   (ii) a combination of silver α-methylacetoacetate and n-pentylamine,
   (iii) a combination of silver α-methylacetoacetate and n-octylamine,
   (iv) a combination of silver α-methylacetoacetate and N-methylhexylamine,
   (v) a combination of silver isobutyrylacetate and 2-ethylhexylamine,
   (vi) a combination of silver benzoylacetate and 2-ethylhexylamine,
   (vii) a combination of silver acetoacetate and n-propylamine,
   (viii) a combination of silver acetoacetate and n-butylamine,
   (ix) a combination of silver acetoacetate and n-pentylamine,
   (x) a combination of silver acetoacetate and n-hexylamine,
   (xi) a combination of silver acetoacetate and 2-ethylhexylamine,
   (xii) a combination of silver acetoacetate and n-octylamine, and
   (xiii) a combination of silver acetoacetate and N-methylhexylamine,
wherein the silver acetate described in (i) to (xiii) is present in 35 mass % to 50 mass % of the total composition and the amine described in (i) to (xiii) is present in 30 mass % to 60 mass % of the total composition.

9. The substrate according to claim 8, wherein the substrate is made of polyethylene terephthalate.

10. The substrate according to claim 8, wherein the substrate is made of polyethylene terephthalate, and the metallic silver layer is formed directly on the substrate.

11. The substrate according to claim 8, wherein the silver ink composition consists of one of (i) to (xiii) and a solvent selected from the group consisting of ethanol, methanol, 1-butanol, tetrahydrofuran, 2,6-dimethyl-4-heptanone, and combinations thereof.

* * * * *